United States Patent
Wang

(10) Patent No.: US 10,878,035 B2
(45) Date of Patent: Dec. 29, 2020

(54) INTERACTIVE METHOD AND APPARATUS BASED ON DEEP QUESTION AND ANSWER

(71) Applicant: BEIJING BAIDU NETCOM SCIENCE AND TECHNOLOGY CO., LTD., Beijing (CN)

(72) Inventor: Zhisheng Wang, Beijing (CN)

(73) Assignee: BEIJING BAIDU NETCOM SCIENCE AND TECHNOLOGY CO. LTD., Beijing (CN)

(*) Notice: Subject to any disclaimer, the term of this patent is extended or adjusted under 35 U.S.C. 154(b) by 91 days.

(21) Appl. No.: 15/850,672

(22) Filed: Dec. 21, 2017

(65) Prior Publication Data

US 2018/0181678 A1 Jun. 28, 2018

(30) Foreign Application Priority Data

Dec. 27, 2016 (CN) .......................... 2016 1 1230209

(51) Int. Cl.
| | | |
|---|---|---|
| *G06F 16/9032* | (2019.01) | |
| *G06F 40/10* | (2020.01) | |
| *G06F 40/30* | (2020.01) | |
| *G06F 16/58* | (2019.01) | |
| *G06F 16/9038* | (2019.01) | |

(Continued)

(52) U.S. Cl.
CPC .... *G06F 16/90332* (2019.01); *G06F 16/3344* (2019.01); *G06F 16/5866* (2019.01); *G06F 16/9038* (2019.01); *G06F 40/10* (2020.01); *G06F 40/211* (2020.01); *G06F 40/284* (2020.01); *G06F 40/30* (2020.01); *G06F 40/247* (2020.01)

(58) Field of Classification Search
CPC ............... G06F 40/30; G06F 16/90335; G06F 16/90332; G06F 16/3344; G06F 40/211; G06F 40/247; G06F 16/3329; G06F 40/20; G06F 16/5866; G06F 40/10; G06F 40/284; G06F 16/9038; G06F 40/242
See application file for complete search history.

(56) References Cited

U.S. PATENT DOCUMENTS 8,484,192 B1 * 7/2013 Sahami ............... G06F 16/9535
 707/708
8,909,656 B2 * 12/2014 Kumar .................. G06F 16/904
 707/754

(Continued)

FOREIGN PATENT DOCUMENTS

| CN | 104573028 | | 4/2015 | |
|---|---|---|---|---|
| CN | 104573028 A | * | 4/2015 | ............. G06F 17/30 |

OTHER PUBLICATIONS

Wenjuan Wu et al., An Automatic Acquisition of Domain Knowledge from List-Structrued Text in Baidu Encyclopedia, pp. 1-8, IUCS2010. (Year: 2010).*

(Continued)

*Primary Examiner* — Cheyne D Ly
(74) *Attorney, Agent, or Firm* — Hodgson Russ LLP

(57) ABSTRACT

The present disclosure provides an interactive method and an interactive apparatus based on deep question and answer. The interactive method includes: receiving a query; extracting a logic tag of the query, extracting a keyword of the query, and acquiring a search result corresponding to the logic tag and the keyword based on a logical structure data table; and displaying the search result.

11 Claims, 5 Drawing Sheets

(51) Int. Cl.
    *G06F 16/33*     (2019.01)
    *G06F 40/211*     (2020.01)
    *G06F 40/284*     (2020.01)
    *G06F 40/247*     (2020.01)

(56) References Cited

U.S. PATENT DOCUMENTS

| | | | |
|---|---|---|---|
| 2009/0132969 A1* | 5/2009 | Mayer | G06F 16/28 715/862 |
| 2014/0040275 A1* | 2/2014 | Dang | G06F 16/2228 707/741 |
| 2015/0278198 A1* | 10/2015 | Andreev | G06F 16/3344 704/9 |
| 2016/0055246 A1* | 2/2016 | Marcin | G06F 17/278 707/732 |
| 2017/0177589 A1* | 6/2017 | Shorman | G06F 16/48 |
| 2019/0286996 A1* | 9/2019 | Tian | G06F 16/3344 |

OTHER PUBLICATIONS

Liu, Qian, et al, Extracting Attributes and Synonymous Attributes from Online Encyclopedias, 2014 IEEE/WIC/ACM International Joint Conferences on Web Intelligence (WI) and Intelligent Agent Technologies (IAT), pp. 290-296. (Year: 2014).*

Zhibin Zhou et al., An Answer Extraction Method of Simple Question Based on Web Knowledge Library, 2010 Second International Workshop on Education Technology and Computer Science, pp. 308-311. (Year: 2010).*

Song et al., Exploiting Collective Hidden Structures in Webpage Titles for Open Domain Entity Extraction, WWW 2015, May 18-22, 2015, Florence, Italy, pp. 1014-1024. (Year: 2015).*

Wang et al., Research on Extraction Methods of Web Page's Document Logical Structure, Information Technology Journal vol. 13 (1): 69-77, 2014 (Year: 2014).*

SIPO, First Office Action for CN Application No. 201611230209.2, dated Jul. 29, 2019.

* cited by examiner

INTERACTIVE METHOD AND APPARATUS BASED ON DEEP QUESTION AND ANSWER

CROSS-REFERENCE TO RELATED APPLICATION

The present application is based upon and claims priority to Chinese Patent Application No. 201611230209.2, filed on Dec. 27, 2016, the entirety contents of which are incorporated herein by reference.

FIELD

The present disclosure relates to a field of natural language processing technology, and more particularly to an interactive method and an interactive device based on deep question and answer.

BACKGROUND

Deep question and answer is technology for understanding human's language, intelligent identifying meanings of a question, and extracting an answer to the question from massive internet data.

Users may have requirements for asking questions such as "what does blue thin mushroom means", "detail information about Nie Shubin's case" and "who is Luo Jin" during a process of reading news. Although the user may acquire answers by searching for related webpages with the help of a search engine, searching and browsing the webpages may cost a long time, the efficiency is low and the results are not precise enough.

SUMMARY

Embodiments of the present disclosure seek to solve at least one of the problems existing in the related art to at least some extent.

Accordingly, a first objective of the present disclosure is to provide an interactive method based on deep question and answer. The interactive method may improve the search efficiency and the precision of the search results.

A second objective of the present disclosure is to provide an interactive apparatus based on deep question and answer.

In order to achieve the above objectives, embodiments of a first aspect of the present disclosure provide an interactive method based on deep question and answer. The interactive method includes: receiving a query; extracting a logic tag of the query, extracting a keyword of the query, and acquiring a search result corresponding to the logic tag and the keyword based on a logical structure data table; and displaying the search result.

In order to achieve the above objectives, embodiments of a second aspect of the present disclosure provide an interactive apparatus based on deep question and answer. The interactive apparatus includes: a receiving module, configured to receive a query; an acquiring module, configured to extract a logic tag of the query, to extract a keyword of the query, and to acquire a search result corresponding to the logic tag and the keyword based on a logical structure data table; and a displaying module, configured to display the search result.

Embodiments of the present disclosure also provide a device, including: one or more processors; a memory for storing one or more programs; when the one or more programs are executed by the one or more processors, the one or more processors are configured to execute the method according to any of embodiments of the first aspect of the present disclosure.

Embodiments of the present disclosure also provide a non-transitory computer readable storage medium for storing one or more application programs, when the one or more application programs executed by one or more processors of a device, the one or more processors are configured to execute the method according to any of the embodiments of the first aspect of the present disclosure.

Embodiments of the present disclosure also provide a computer program product that, when executed by one or more processors of a device, causes the one or more processors to execute the method according to any of the embodiments of the first aspect of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figures 1, 2:
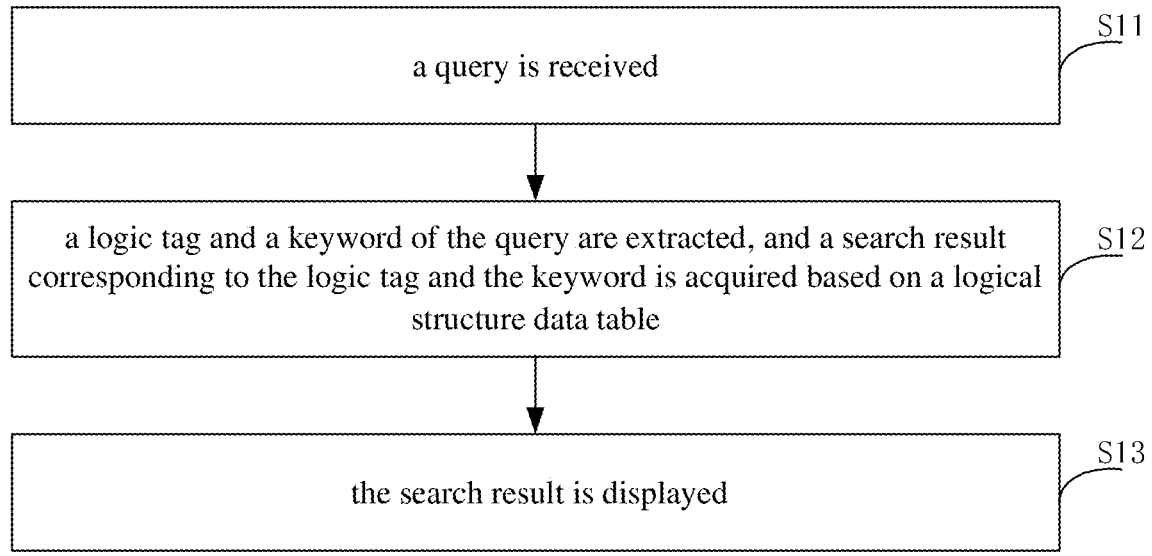
FIG. 1 is a flow chart of an interactive method based on deep question and answer according to an embodiment of the present disclosure.
FIG. 2 is a schematic diagram of a logical structure data table according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

FIG. 1 is a flow chart of an interactive method based on deep question and answer according to an embodiment of the present disclosure.

As shown in FIG. 1, the interactive method includes the following acts.

In block S11, a query is received.

For example, the user may input the query via a client, the client may send the query to a server, and the server may receive the query sent by the client.

In block S12, a logic tag and a keyword of the query are extracted, and a search result corresponding to the logic tag and the keyword is acquired based on a logical structure data table.

Block S12 may be executed by the server.

Logic tags, keywords and corresponding answer data may be recorded in the logical structure data table. For example, an exemplary logical structure data table is shown in FIG. 2, in which each column represents a keyword such as "Luo Jin", "Fan Bingbing" or the like, each row represents a logic tag such as "introduction", "background" or the like, and shade parts represent answer data corresponding to the keywords and the logic tags. For example, the data 23 in FIG. 2 represents the answer data corresponding to the logic tag 21 "introduction" and the keyword 22 "Luo Jin".

The data recorded in the logical structure data table may be acquired based on encyclopedia data. For example, the above desired data may be acquired by analyzing lexical items of the encyclopedia data. Detailed content of establishing the logical structure data table will be described below.

Corresponding data may be found in the logical structure data table after the logic tag and the keyword of the query are extracted. For example, the data 23 is regarded as the search result according to the logical structure data table shown in FIG. 2 if the logic tag is "introduction" and the keyword is "Luo Jin".

It should be noted that some data in the logical structure data table may be null and some search results acquired in this case may be null accordingly. For example, when the logic tag is "background" and the keyword is "Luo Jin", the search result may be null based on the logical structure data table, since the data corresponding to "background" and "Luo Jin" is null.

It could be understood that the query input by the user is not limited to text, the query in other forms may be allowed, such as a speech. Taking a speech input as an example, the speech input may be recognized on the client or the server, and the text data may be acquired. The above extracting process may be executed based on the text data.

In block S13, the search result is displayed.

For example, the server may send the search result to the client after the search result is acquired, and the client may display the search result for the user.

Figure 3:
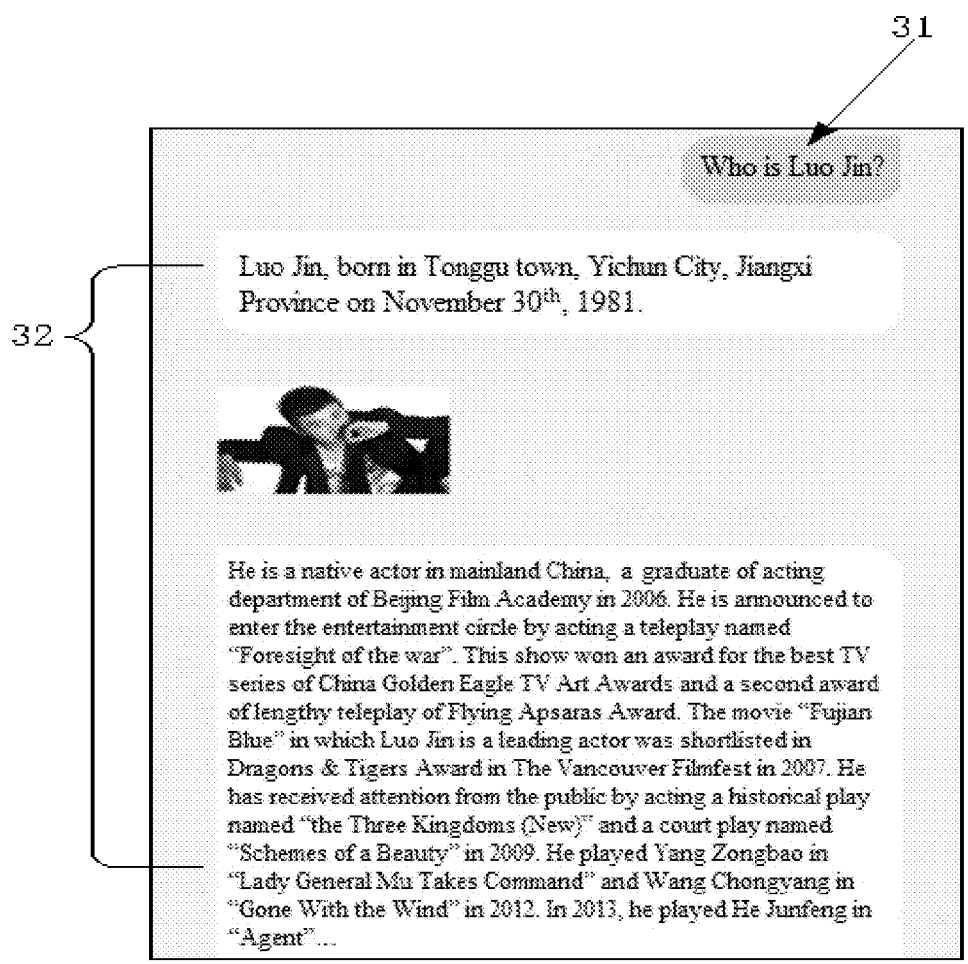
FIG. 3 is a schematic diagram of a displaying effect of search results according to an embodiment of the present disclosure.

As shown in FIG. 3, a schematic diagram of a displaying effect of search results is provided. Referring to FIG. 3, the search result 32 may be displayed for the user after the user input the query 31 "who is Luo Jin".

It should be noted that the search result displayed in related arts may be link information of the webpage. Instead, the search results displayed in embodiments of the present disclosure are not link information. Specifically, the search result may include a text and/or an image. For example, the search result in FIG. 3 includes an image and texts, in other words the search result may be illustrated to the user based on pictures and their corresponding essays.

It could be understood that the displayed search results are not limited to texts. For example, the text may be converted into the speech by speech synthesis, such that the search result may be feedback to the user in a form of speech in a case of voice-operated application without a screen.

In this embodiment, the search result instead of the link information may be displayed, such that there is no need for the user to open the webpage to see the results, which means that the search efficiency may be improved. Additionally, since the search results are acquired based on the logical structure data table, the logical structure data table is established based on the encyclopedia data and the encyclopedia data are authoritative, the efficiency of the search results may be improved.

Figure 4:
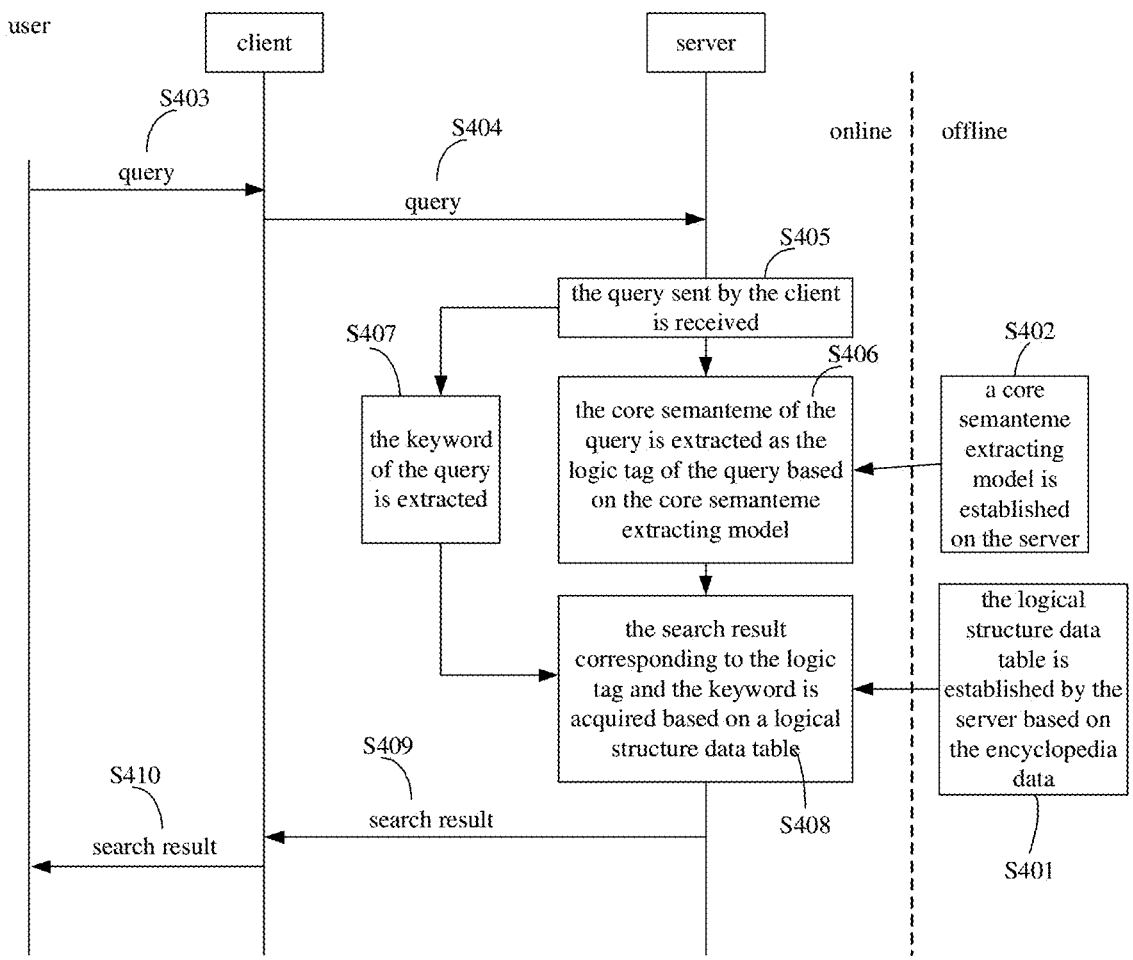
FIG. 4 is a flow chart of an interactive method based on deep question and answer according to another embodiment of the present disclosure.

FIG. 4 is a flow chart of an interactive method based on deep question and answer according to another embodiment of the present disclosure.

As shown in FIG. 4, the method of the embodiment also includes the following acts.

In block S401, the logical structure data table is established by the server based on the encyclopedia data.

The encyclopedia is an open knowledge platform which is edited and maintained by hundreds and thousands of volunteers and experts in various fields. For example, there are millions and millions of lexical items in Baidu Encyclopedia provided by more than six million volunteers until now. The quality of most of the lexical items in Baidu Encyclopedia is higher than the lexical items in common webpages. In addition, editing regulations of Baidu Encyclopedia are standard, which means that there are clear logical structures for the lexical items respectively. These features make the encyclopedia data suitable to give the user precise answers to the query.

The keyword, the logic tag and the search result corresponding to the logic tag and the keyword are recorded in the logical structure data table. These data may be determined after the lexical items of the encyclopedia data are analyzed.

Each of the lexical items of the encyclopedia data may be edited in a certain editing regulation. Generally, each lexical item includes a title, an abstract and a sub-title. The abstract also called "encyclopedia card" is a general introduction, and the sub-title is a logical structure defined in the editing regulation. For example, a lexical item of a character may include "experience", "work achievement", "evaluation" etc., a lexical item of an event may include "background", "causes", "latest developments" etc. HTML documents may be analyzed when extracting the encyclopedia data, such that the title, the abstract and the sub-title of each lexical item may be acquired.

From each lexical item, the keyword, the logic tag and the answer data of the lexical item may be extracted, and then the keyword, the logic tag and the answer data corresponding to each lexical item may be regarded as an item in the logical structure data table, such that the logical structure data table may be established according to the mass data of the lexical items.

The keyword, the logic tag and the answer data may be extracted from the lexical item as follows.

Keyword: the title of the lexical item may be regarded as the keyword. For example, the title of a lexical item is "Luo Jin", and then "Luo Jin" may be regarded as one of the keywords.

Alternatively, if the title of the lexical item is too long, a core word and its closest adjectives may be extracted as a keyword. For example, if the title of the lexical item is "7.23 北京八达岭野生动物园老虎伤人事件 (tiger attacking event in Beijing Badaling safari park on July 23$^{rd}$)", "老虎伤人事件 (tiger attacking event)" may be regarded as the keyword if the extracted core word is "事件 (event)" and the closest adjective is "老虎伤人 (tiger attacking)".

Figure 5:
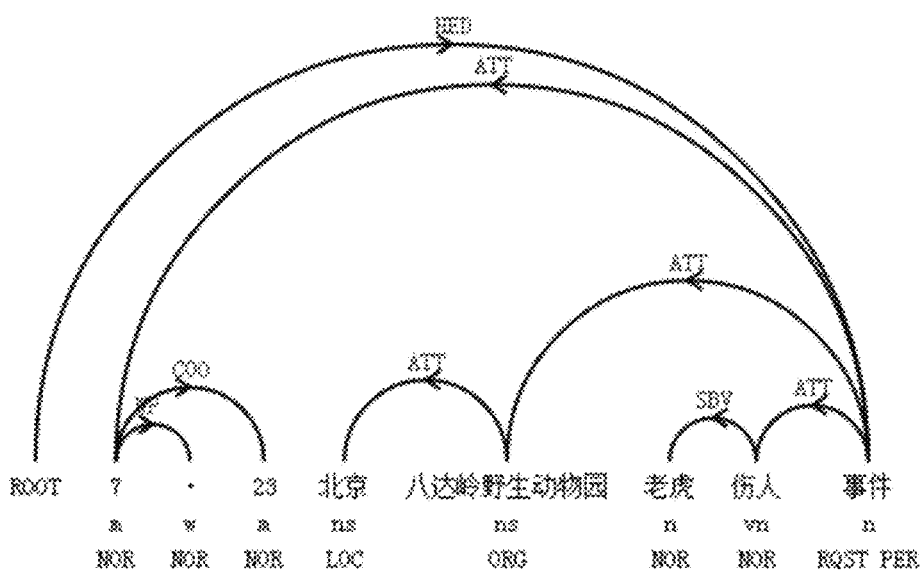
FIG. 5 is a schematic diagram showing a result of dependency syntax parsing and a semantic analysis performed on a query according to an embodiment of the present disclosure.

Specifically, a long title of a lexical item may be regarded as a sentence when extracting the core word and the closest adjectives, and the core word and the closest adjectives of the sentence may be acquired after a dependency syntax parsing and a semantic analysis are performed on the sentence. After the dependency syntax parsing and the semantic analysis are performed on the sentence as shown in the above example, analyzed result may be acquired as illustrated in FIG. 5, in which lines and the above upper case letters represent dependency relationships, for example, "HED" represents a head relation, "ATT" represents an attribute relation; a lower case letter represents an analyzing result of part of speech, for example, "m" represents a numeral, "w" represents a punctuation; and upper case letters at the bottom represent named entity identifying results, for example, "NOR" represents a non-proper noun, and "LOC" represents a place name. Concerning other parts which are not illustrated, reference may be made to the description of the dependency relationship, the part of speech and the type of the named entity in the related art. The core word (i.e., the word indicated by "HED") may be determined according to the dependency relationship, for example, "事件" in the above embodiment is a core word. The closest adjective of the core word may be determined based on the dependency relationship, the part of speech and the type of the named entity. For example, a noun which has the dependency relationship with the core word or a closest proper noun of the core word may be regarded as the closest adjective.

In FIG. 2, there is one keyword in each column of the logical structure data table. It should be noted that the number of the keywords in one column of the logical structure data table is not limited to one, there may be a group of the keywords, which may be synonyms (such as "League of Legends" and "LOL").

Accordingly, other synonyms may be found after one keyword is extracted from the title of the lexical term, such that several synonyms may be recorded in one column of the logical structure data table. Any of following ways or the combination may be used for determining the synonyms.

In a first way, the synonyms may be determined based on alternative names of the lexical terms in the encyclopedia data. For example, if a lexical term is entitled "A" and the alternative name of the lexical term is "B", "A" and "B" are synonyms.

In a second way, the synonyms may be determined based on a synonym dictionary. For example, the synonyms may be determined based on the synonyms recorded in the synonym dictionary.

In a third way, the synonyms may be determined based on the manual label. For example, the synonyms may be labeled by experts in the art.

In a fourth way, the synonyms may be determined based on automatic mining by a search engine. In this way, similar queries may be acquired according to click situations in the search engine, for example, click distributions of "is it fun to play League of Legends" and "is it fun to play LOL" are similar. Common parts of the two queries are deleted, and the remaining parts may be a pair of potential synonyms.

Logic tag: the sub-title of the lexical term may be normalized to the preset logic tag.

Original encyclopedia data are half-structured, which could be understood that there are several sub-titles (identified by HTML syntax rules) of each lexical term. For example, for the lexical item "tiger attacking event in Beijing Badaling safari park on July $23^{rd}$", sub-titles such as "event background", "event process", "event results" and "event causes" etc. may be included. The sub-titles of the lexical term are normalized to the preset logic tags (the logic tags of lexical items in an event category may include "background", "causes", "process", "latest developments" etc.). The normalization method is to compute text similarities and to select a tag of which the similarity is greatest and greater than a similarity threshold as the normalized tag. If the sub-title is unable to be normalized, the original sub-title may be used as the logic tag. The abstract of the lexical term may be mapped to the logic tag "introduction" directly.

Answer data: the data in the sub-title corresponding to the logic tag of a lexical term comprising the keyword may be regarded as the answer data after the keyword and the logic tag are determined.

As described above, the keyword, the logic tag and the answer data of the lexical item may be extracted respectively, in which the keyword, the logic tag and the answer data corresponding to one lexical item may be used as an item in the logical structure data table, such that the logical structure data table may be established according to the mass data of the lexical items.

In block S402, a core semanteme extracting model is established on the server.

The core semanteme extracting model is used for extracting core semanteme of the query. For example, the core semanteme of "what does blue thin mushroom mean" or "who is Luojin" is "introduction", the core semanteme of "detail information about Nie Shubin's case" is "detail information", and the core semanteme of "why the tiger attacking event happens" is "causes".

Figure 6:
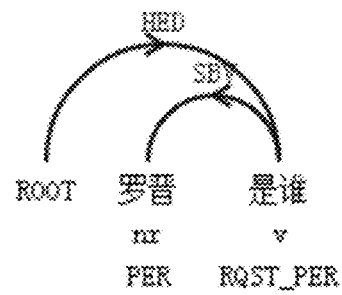
FIG. 6 is schematic diagram showing a result of dependency syntax parsing and a semantic analysis performed on a non-labeled query according to an embodiment of the present disclosure.
Figure 7:
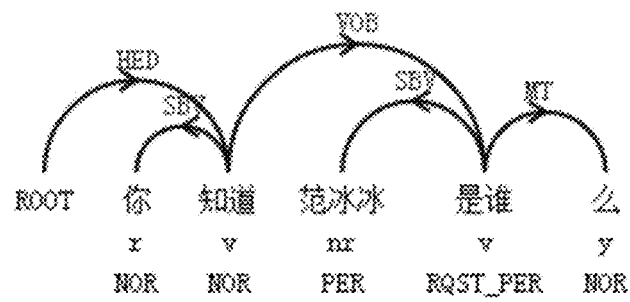
FIG. 7 is schematic diagram showing a result of dependency syntax parsing and a semantic analysis performed on another non-labeled query according to an embodiment of the present disclosure.

Specifically, the core semanteme may be generated after training based on low volume (such as less than a first predetermined threshold) labeled queries and massive (such as greater than a second predetermined threshold) non-labeled random queries. For a labeled query, the query may be labeled by logic tags such as "introduction", "causes", "background" etc. For a non-labeled random query, frequency of the semantic dependency relationship may be computed. Referring to FIG. 6 and FIG. 7, the semantic dependency relationship "<SBV><-是谁 (who is)" is included in both of "罗晋是谁 (who is Luojin)" and "你知道范冰冰是谁 (Do you know who is Fan Bingbing)". From a perspective of whole random queries, the frequency of the semantic dependency relationship "<SBV><-是谁" is high and thus the potential value of this semantic dependency relationship is big. A key of the core semanteme extracting model is to use the massive non-labeled random queries to acquire a candidate set of the semantic dependency relationships with high frequencies, and to select several suitable semantic dependency relationships and to label the suitable semantic dependency relationships with logic tags, such that the low volume labeled queries may be fitted in the case that the non-labeled random queries are involved as many as possible. The selected semantic dependency relationships and the logic tags attached thereon may be the core semanteme extracting model.

It should be understood that block S401 and block S402 may be pre-established off-line so as to be applied in an online search process subsequently. There is no order limitation to block S401 and block S402, which means that block S402 may be executed after block S401, or block S401 may be executed after block S402, or block S401 and block S402 may be executed in parallel.

In block S403, the query input by the user is received at the client.

The query may be input by the user in a form of text or speech.

In block S404, the query is sent by the client to the server.

In block S405, the query sent by the client is received by the server.

In block S406, the core semanteme of the query is extracted by the server based on the core semanteme extracting model, in which the core semanteme is used as the logic tag of the query.

The core semanteme extracting model is configured as a core semanteme online service. The core semanteme of the original query may be acquired based on the semantic dependency relationship matching. It should be noted that not all of the queries may acquire the core semanteme, and those queries without core semantemes may be abandoned.

In block S407, the keyword of the query is extracted by the server.

Following ways with priorities in a descending order may be used for extracting the keyword.

(1) The subject or an object related to the core semantic word directly may be extracted as the keyword. For example, "是谁" is a core semantic word, and "罗晋 (Luo Jin)" and "范冰冰 ((Fan Bingbing)" related to "who" directly are regarded as the keywords.

(2) The proper noun having a closest editing distance with the core semantic word in the query may be extracted as the keyword.

(3) The notional words including nouns and verbs may be extracted as the keywords.

According to the above priority order, once one keyword is extracted, the extracted keyword may be deleted from the original query to avoid repetitive extracting. In practice, there may be more than one keyword or no keyword at all.

It should be noted that the query received by the server may be converted into a text if the query is not a text, and the logic tag and the keyword corresponding to the query may be extracted thereafter to execute subsequent steps.

It could be understood that there is no order limitation to block S406 and block S407.

In block S408, the search result corresponding to the logic tag and the keyword is acquired by the server based on a logical structure data table.

The logical structure data table may be established by ordering the processed encyclopedia data in two dimensions of the keyword and the logic tag. As shown in FIG. 2, the corresponding answer data is represented in the shade parts.

The corresponding answers may be acquired as the search results rapidly by searching in use of the keyword and the logic tag extracted from the current query. The answer may be selected according to priorities of the keywords when more than one answer is acquired.

In block S409, the search result is sent to the client by the server.

In block S410, the search result is displayed to the user by the client.

It could be understood that the parts not described in detail in this embodiment may refer to relative parts in relative embodiments.

In this embodiment, the search result may include images or texts, such that the search result may be illustrated for the user in more detail. The user may acquire the search result directly without any additional expenditure of time. The search result may be acquired without a URL processing, and may interact with the user in a natural dialogue manner. Therefore, the method is suitable in a voice-operated application without a screen. The search result is from the lexical terms of the encyclopedia data edited manually, which has a high quality, stability and authority.

Figure 8:
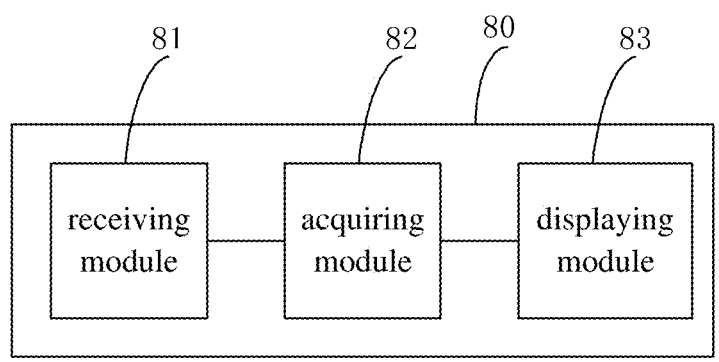
FIG. 8 is a block diagram of an interactive apparatus based on deep question and answer according to an embodiment of the present disclosure.

FIG. 8 is a block diagram of an interactive apparatus based on deep question and answer according to an embodiment of the present disclosure.

As shown in FIG. 8, the interactive apparatus 80 includes: a receiving module 81, an acquiring module 82 and a displaying module 83.

The receiving module 81 is configured to receive a query.

The acquiring module 82 is configured to extract a logic tag of the query, to extract a keyword of the query, and to acquire a search result corresponding to the logic tag and the keyword based on a logical structure data table.

The displaying module 83 is configured to display the search result.

In some embodiment, the search result includes an image and/or a text.

Figure 9:
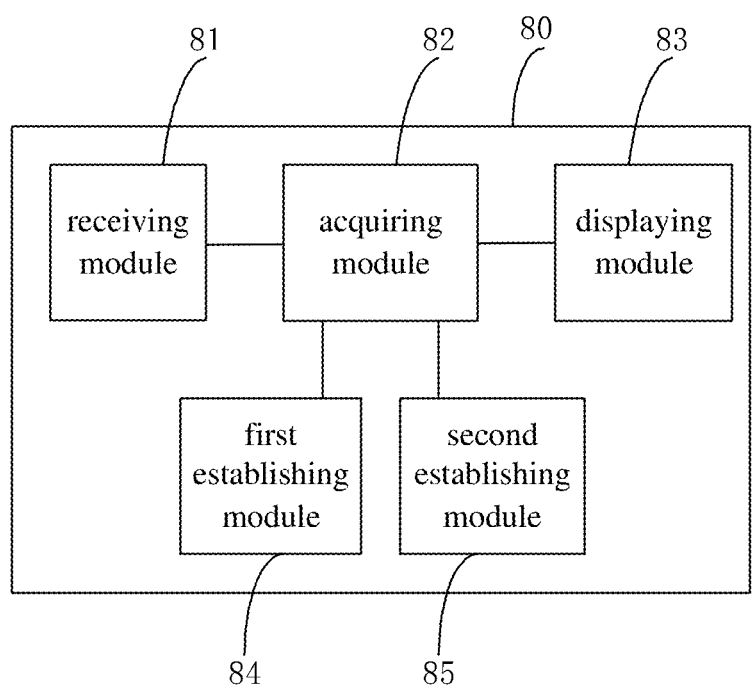
FIG. 9 is a block diagram of an interactive apparatus based on deep question and answer according to another embodiment of the present disclosure.

In some embodiment, referring to FIG. 9, the apparatus 80 also includes: a first establishing module 84 configured to establish the logical structure data table based on encyclopedia data. The first establishing module 84 is further configured to extract a keyword from a title of a lexical item in the encyclopedia data, to select the keyword from the title or a combination of the keyword from the title and a synonymy of the keyword from the title as a keyword corresponding to the lexical item, and to normalize a subtitle of the lexical item to a predetermined logic tag; and to form the logical structure data table based on the keyword corresponding to the lexical item and the predetermined logic tag normalized.

The keyword and the logic tag corresponding to the lexical term are constructed into the logical structure data table.

In some embodiments, the acquiring module 82 is configured to extract the logic tag of the query by extracting a core semanteme of the query as the logic tag of the query based on a core semanteme extracting model.

In some embodiments, referring to FIG. 9, the apparatus 80 also includes a second establishing module 85, configured to establish the core semanteme extracting model based on low volume labeled queries and massive non-labeled random queries.

In some embodiments, the acquiring module 82 is configured to extract the keywords of the query by: performing a dependency syntax parsing on the query so as to acquire a core word of the query, and selecting a term directly related to the core word as the keyword of the query; or acquiring from the query a proper noun having a closest editing distance with a core word of the query, and selecting the proper noun as the keyword of the query; or acquiring a content word in the query as the keyword of the query.

It could be understood that the apparatus embodiments correspond to the method embodiments, and the detail content of the apparatus embodiments may refer to the method embodiments, which will not be described in detail herein.

In this embodiment, since the search result rather than link information is displayed, the user may see the search result without opening the webpages, which may improve the search efficiency. Furthermore, since the search results may be acquired based on the logical structure data table established based on encyclopedia data and the encyclopedia data are authoritative, the precision of the search results may be improved.

It should be understood that the same or similar parts in the embodiments are just references to each other, and concerning the content which is not described in detail, reference may be made to the same or similar parts in other embodiments.

Those skilled in the art shall understand that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. An interactive method based on deep question and answer, comprising:
   receiving a query;
   extracting a logic tag of the query, extracting a keyword of the query, and acquiring a search result corresponding to the logic tag and the keyword based on a logical structure data table;
   displaying the search result; and
   establishing the logical structure data table based on encyclopedia data, comprising:
      extracting a keyword from a title of a lexical item in the encyclopedia data, selecting the keyword from the title or a combination of the keyword from the title and a synonymy of the keyword from the title as a keyword corresponding to the lexical item, and normalizing a sub-title of the lexical item to a predetermined logic tag; and
      forming the logical structure data table based on the keyword corresponding to the lexical item and the predetermined logic tag normalized;
   wherein extracting a logic tag of the query comprises:
      extracting a core semanteme of the query as the logic tag of the query based on a core semanteme extracting model;
   wherein the method further comprises: establishing the core semanteme extracting model comprising: establishing the core semanteme extracting model by training with a number of labeled queries less than a predetermined first threshold and a number of non-labeled queries greater than a predetermined second threshold.

2. The interactive method according to claim 1, wherein the search result comprises at least one of an image and a text.

3. The interactive method according to claim 1, wherein extracting a keyword of the query comprises:
   performing a dependency syntax parsing on the query so as to acquire a core word of the query, and selecting a term directly related to the core word as the keyword of the query.

4. The interactive method according to claim 1, wherein extracting a keyword of the query comprises: acquiring from the query a proper noun having a closest editing distance with a core word of the query, and selecting the proper noun as the keyword of the query.

5. The interactive method according to claim 1, wherein extracting a keyword of the query comprises: acquiring a content word in the query as the keyword of the query.

6. An interactive apparatus based on deep question and answer, comprising:
   one or more processors;

a memory storing instructions executable by the one or more processors;

wherein the one or more processors are configured to:

receive a query;

extract a logic tag of the query, extract a keyword of the query, and acquire a search result corresponding to the logic tag and the keyword based on a logical structure data table; and display the search result;

wherein the one or more processors are further configured to establish the logical structure data table based on encyclopedia data by acts of:

extracting a keyword from a title of a lexical item in the encyclopedia data, selecting the keyword from the title or a combination of the keyword from the title and a synonymy of the keyword from the title as a keyword corresponding to the lexical item, and normalizing a sub-title of the lexical item to a predetermined logic tag; and forming the logical structure data table based on the keyword corresponding to the lexical item and the predetermined logic tag normalized:

wherein the one or more processors are further configured to extract a logic tag of the query by an act of:

extracting a core semanteme of the query as the logic tag of the query based on a core semanteme extracting model;

wherein the one or more processors are further configured to establish the core semanteme extracting model by training with a number of labeled queries less than a predetermined first threshold and a number of non-labeled queries greater than a predetermined second threshold.

7. The interactive apparatus according to claim 6, wherein the search result comprises at least one of an image and a text.

8. The interactive apparatus according to claim 6, wherein the one or more processors are configured to extract a keyword of the query by acts of:

performing a dependency syntax parsing on the query so as to acquire a core word of the query, and selecting a term directly related to the core word as the keyword of the query.

9. The interactive apparatus according to claim 6, wherein the one or more processors are configured to extract a keyword of the query by an act of:

acquiring from the query a proper noun having a closest editing distance with a core word of the query, and selecting the proper noun as the keyword of the query.

10. The interactive apparatus according to claim 6, wherein the one or more processors are configured to extract a keyword of the query by an act of:

acquiring a content word in the query as the keyword of the query.

11. A non-transitory computer-readable storage medium having stored therein instructions that, when executed by a processor of a device, cause the processor to perform an interactive method based on deep question and answer, the interactive method comprising:

receiving a query;

extracting a logic tag of the query, extracting a keyword of the query, and acquiring a search result corresponding to the logic tag and the keyword based on a logical structure data table; and displaying the search result; and establishing the logical structure data table based on encyclopedia data, comprising:

extracting a keyword from a title of a lexical item in the encyclopedia data, selecting the keyword from the title or a combination of the keyword from the title and a synonymy of the keyword from the title as a keyword corresponding to the lexical item, and normalizing a sub-title of the lexical item to a predetermined logic tag; and forming the logical structure data table based on the keyword corresponding to the lexical item and the predetermined logic tag normalized wherein extracting a logic tag of the query comprises:

extracting a core semanteme of the query as the logic tag of the query based on a core semanteme extracting model;

wherein the method further comprises: establishing the core semanteme extracting model comprising: establishing the core semanteme extracting model by training with a number of labeled queries less than a predetermined first threshold and a number of non-labeled queries greater than a predetermined second threshold.

* * * * *